United States Patent
Zhou et al.

(10) Patent No.: US 10,594,662 B2
(45) Date of Patent: Mar. 17, 2020

(54) METHOD FOR SECURE CONNECTION FROM A CLIENT COMPUTER DEVICE TO A COMPUTER RESOURCE

(71) Applicant: WALLIX, Saint-Honoré (FR)

(72) Inventors: Raphaël Zhou, Choisy le Roi (FR); Serge Adda, Antony (FR)

(73) Assignee: WALLIX, Saint-Honore (FR)

( * ) Notice: Subject to any disclaimer, the term of this patent is extended or adjusted under 35 U.S.C. 154(b) by 177 days.

(21) Appl. No.: 15/756,866

(22) PCT Filed: Sep. 20, 2016

(86) PCT No.: PCT/FR2016/052372
§ 371 (c)(1),
(2) Date: Mar. 1, 2018

(87) PCT Pub. No.: WO2017/051104
PCT Pub. Date: Mar. 30, 2017

(65) Prior Publication Data
US 2018/0248849 A1  Aug. 30, 2018

(30) Foreign Application Priority Data
Sep. 21, 2015 (FR) .................................. 15 58890

(51) Int. Cl.
*H04L 29/06* (2006.01)
*G06F 16/955* (2019.01)

(52) U.S. Cl.
CPC ........ *H04L 63/0281* (2013.01); *G06F 16/955* (2019.01); *H04L 63/08* (2013.01); *H04L 63/105* (2013.01); *H04L 67/42* (2013.01)

(58) Field of Classification Search
CPC ... H04L 63/0281; H04L 63/08; H04L 63/105; G06F 16/955
See application file for complete search history.

(56) References Cited

U.S. PATENT DOCUMENTS

| 2013/0191627 A1 | 7/2013 | Ylonen et al. |
| 2015/0200821 A1* | 7/2015 | Sade ............... H04L 67/28 709/224 |

FOREIGN PATENT DOCUMENTS

| EP | 1523152 A2 | 4/2005 |
| EP | 2894814 A1 | 7/2015 |
| WO | WO2014064686 A1 * | 5/2014 ............. G06F 21/00 |

OTHER PUBLICATIONS

International Search Report for International Application No. PCT/FR2016/052372 dated Dec. 20, 2016, 2 pages.
(Continued)

*Primary Examiner* — Jeffrey C Pwu
*Assistant Examiner* — Thong P Truong
(74) *Attorney, Agent, or Firm* — TraskBritt

(57) ABSTRACT

The application relates to a method for secure connection from a client computer device to a target computer resource comprising a server, comprising the following steps: the emission of a session-opening request by an application installed on the client station, leading to the creation of a primary session between the client station and the proxy gateway, the request containing either the identifier of the target server or the identifier of the target application; and the opening of a session between the proxy gateway and the server. The request-emission step is implemented by the prior opening of a primary session [RDP] between the client station and the proxy gateway by the transmission of a message containing the identifier of the target server or the identifier of the target application.

13 Claims, 2 Drawing Sheets

(56) References Cited

OTHER PUBLICATIONS

International Written Opinion for International Application No. PCT/FR2016/052372 dated Dec. 20, 2016, 6 pages.

* cited by examiner

METHOD FOR SECURE CONNECTION FROM A CLIENT COMPUTER DEVICE TO A COMPUTER RESOURCE

CROSS-REFERENCE TO RELATED APPLICATIONS

This application is a national phase entry under 35 U.S.C. § 371 of International Patent Application PCT/FR2016/052372, filed Sep. 20, 2016, designating the United States of America and published as International Patent Publication WO 2017/051104 A1 on Mar. 30, 2017, which claims the benefit under Article 8 of the Patent Cooperation Treaty to French Patent Application Serial No. 1558890, filed Sep. 21, 2015.

TECHNICAL FIELD

This application relates to the field of application servers and, in particular, to methods and systems for access to application resources hosted on one or more servers by a user.

BACKGROUND

A method for monitoring a session on a target system is known, in particular, in the prior art in European patent application EP 2894814.

A specific temporary agent for monitoring the session is installed on the target system on reception of the opening request coming from the client of the user.

The session is established between the user and the target system through a communication network.

The temporary agent monitors the session and collects data on events that occur on the target system during the session.

The temporary agent is uninstalled when the session ends.

DRAWBACKS OF THE PRIOR ART

The solution disclosed in European patent application EP 2894814 provides an installation step, for example, by means of a PsExec command, requiring additional network connections and particular privileges on the target server.

Moreover, it is necessary to carry out a specific step of uninstalling the agent, in order to prevent off-session execution thereof, unnecessarily consuming computing capacities of the server.

BRIEF SUMMARY

The object of this disclosure is to remedy these drawbacks by disclosing a simpler and safer solution, in particular, avoiding an express uninstalling step. The solution that is the subject matter of this disclosure also avoids security failings.

The disclosure, in its most general sense, relates to a method for secure connection from a client computer device to a target computer resource comprising a server and, where applicable, an application executed on the server using a proxy gateway comprising a memory for recording information relating to the connection, as well as at least one agent executable on the server during a session, the method comprising the following steps:

emission of a request for opening of a session by an application installed on the client station, leading to the creation of a primary session between a client station and the proxy gateway. The request may contain the identifier of the target server or of the target application, opening of a session between the proxy gateway and the server.

The method is characterized in that the step of installation of at least one agent is executed, comprising successively:

the step of opening a secondary session between the proxy gateway and the server, the step comprising the establishment of the redirection of a disk emulated by the proxy gateway on which the agent is recorded, execution of a time-delay script that waits until the emulated disk is available, copying the agent to a directory. This directory may advantageously be a temporary directory situated on the server. The automatic destruction of the directory by the server at the end of the session makes a specific step of uninstalling the agent unnecessary, execution of the agent on the server, establishment of a virtual channel between the server and the gateway for communication between the agent and the gateway, next, the opening of an uplink channel between the client station and the server.

The method also comprises the launching by the agent of an application previously selected by the user, where applicable, the one that can be the desktop manager if no application has been selected by the user.

According to a variant, the method according to the disclosure comprises a prior step of selection of a target resource by the transmission by the client terminal of a digital message comprising an identifier of a user, and of verification by the gateway if the information relating to the use rights associated with the identifier in a database (302) relates to the target source.

Advantageously, it comprises a prior step of selection of a target resource consisting of the transmission by the gateway of digital data comprising the list of the targets corresponding to the data recorded in a database (302) in relation to the identifier transmitted, and the selection by the user of one of the targets proposed.

Advantageously, the database (302) comprises a list of the applications and of the servers hosting each of the applications, as well as the accounts for connecting to these servers.

Preferably, the gateway comprises means for calculating a balance of the charges according to the number of connections already opened to each of the servers, and selection of the least busy server for the new request.

According to an advantageous embodiment, the method comprises a step of executing a computer code for:

interrogating the gateway with a view to obtaining the authentication information corresponding to the account of the application, injecting these data into the application in order to open an application session and to enable the user to use the application.

According to a first variant, the code is installed on the server (500) permanently and in that the access path to this code is defined in the database (302).

According to a second variant, the code is transmitted temporarily by a dedicated channel provided in the multi-channel protocol (400) in order to be executed temporarily on the server (500).

BRIEF DESCRIPTION OF THE DRAWINGS

This disclosure will be better understood from a reading of the following description, referring to non-limitative example embodiments, illustrated by the accompanying drawings, where.

DETAILED DESCRIPTION

Functional Architecture

Figure 1:
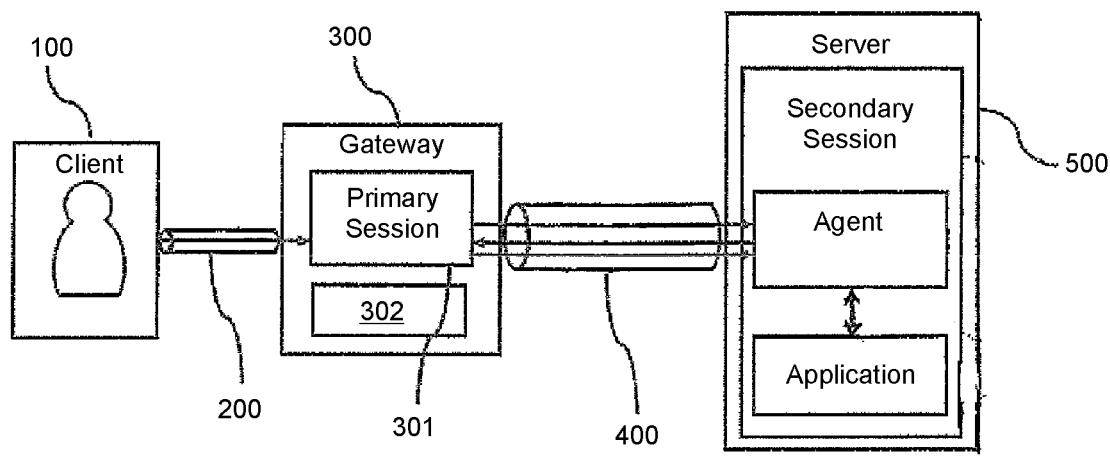
FIG. 1 is a diagram of the functional architecture of the disclosure.

The user is a network or system administrator having limited administration rights for a set of resources for which the network/system administrator is responsible.

The network/system administrator has a terminal (100) communicating with the proxy gateway (300) (or "administration gateway") by means of a connection (200) according to a protocol, for example, SSH ("secure shell") or RDP ("remote desktop protocol").

The connection gives rise to the creation of a primary session (301) on the gateway (300).

The user is identified by numerical identifiers that are specific to the user, and defining the user's rights, as well as the charging of the actions that the user performs.

The gateway (300) comprises a database (302) in which the identifiers of the authorized users are recorded, as well as the associated rights, defining the targets (accounts and equipment) on which the user is entitled to act.

At the time of connection, two methods for selecting the resource are possible:
  according to the first method, the user, at the time of the connection, specifies the target that the user wishes to access. In this case, the gateway checks whether the user identified by the user's identifier has necessary authorizations for accessing this target, according to the information recorded in the database (302).
  according to the second method, the gateway transmits to the user the list of targets corresponding to the data recorded in the database (302) in relation to the transmitted identifier, to enable the user to select one of the targets proposed.

The following step consists of opening a connection, generally with the same SSH or RDP protocol or with a second protocol, with the account associated with the selected target. This step comprises successively:
  the step of opening a secondary session between the proxy gateway and the server, the step comprising the establishment of the redirection of an emulated disk emulated by the proxy gateway on which the agent is recorded,
  execution of a time-delay script that waits until the emulated disk is available,
  copying the agent to a temporary directory situated on the server. The automatic destruction of the directory by the server at the end of the session makes a specific step of uninstalling the agent unnecessary,
  execution of the agent on the server,
  the establishment of a virtual channel between the server and the gateway for communication between the agent and the gateway,
  next, the opening of an opening channel between the client station and the server.

When the target is an application, the gateway (300) chooses the appropriate server (500) for executing the application. To this end, the database (302) comprises a list of applications and of the servers hosting each of the applications, as well as the accounts for connecting to these servers.

When a plurality of servers host the same application, the gateway effects a balance of the charge according to the number of connections already opened to each of the servers and, for the new request, selects the busy server.

Likewise, in the absence of a response by a server hosting an application, the gateway successively seeks the other servers hosting the same application in order to select an available target.

The method also comprises the launch by the agent of an application previously selected by the user, where applicable, the one that can be the desktop manager if no application has been selected by the user. The launch of an application may be dedicated if necessary to a specialist computer code in order:
  to interrogate the gateway with a view to obtaining the authentication information corresponding to the account of the application, for example, a password or a cryptographic certificate, or a Kerberos ticket;
  to inject these data into the application in order to open an application session and to enable the user to use the application.

This code may:
  be installed on the server (500) permanently. In this case, the access path to this code is defined in the database (302); or
  be transmitted temporarily by a dedicated channel provided in the multichannel protocol (400) in order to be executed temporarily on the server (500).

The name of this code may be uniquely generated in order to make it more difficult to alter this code during the execution of the application by means of a computer attack.

This temporarily installed code may also comprise a unique token in order to reduce the risks of unauthorized access to the data recorded in the base (302) by means of the opened session by an attacker having access to the server (500).

Competing Access to Applications on the Same Server by a Plurality of Users

Figure 2:
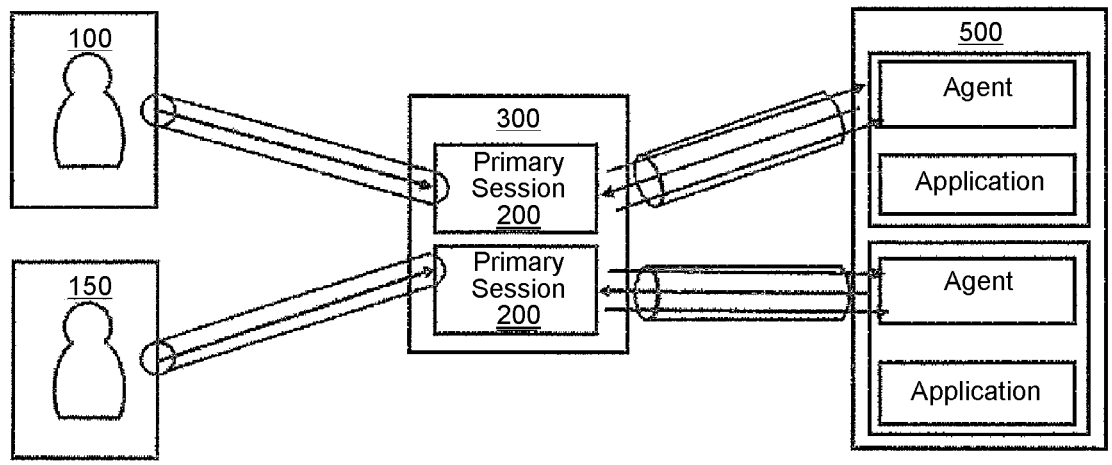
FIG. 2 is a diagram of the functional architecture of a variant embodiment of the disclosure.

FIG. 2 is a functional diagram of a solution enabling a plurality of users to have access to applications hosted on the same server. The aim is to prevent interference between sessions and to make them impermeable in terms of security.

To this end, when a second user (150) seeks to execute an application hosted on the same server (500) as an application executed for a first user (100), the gateway (300) will inhibit the data in the database (302) relating to the account used by the first user (100) on the server (500). It will enable the execution of an application on this same server (500) only if an account remains available for a second user (150).

Data Exchanged Between the Computer Resources

Figure 3:
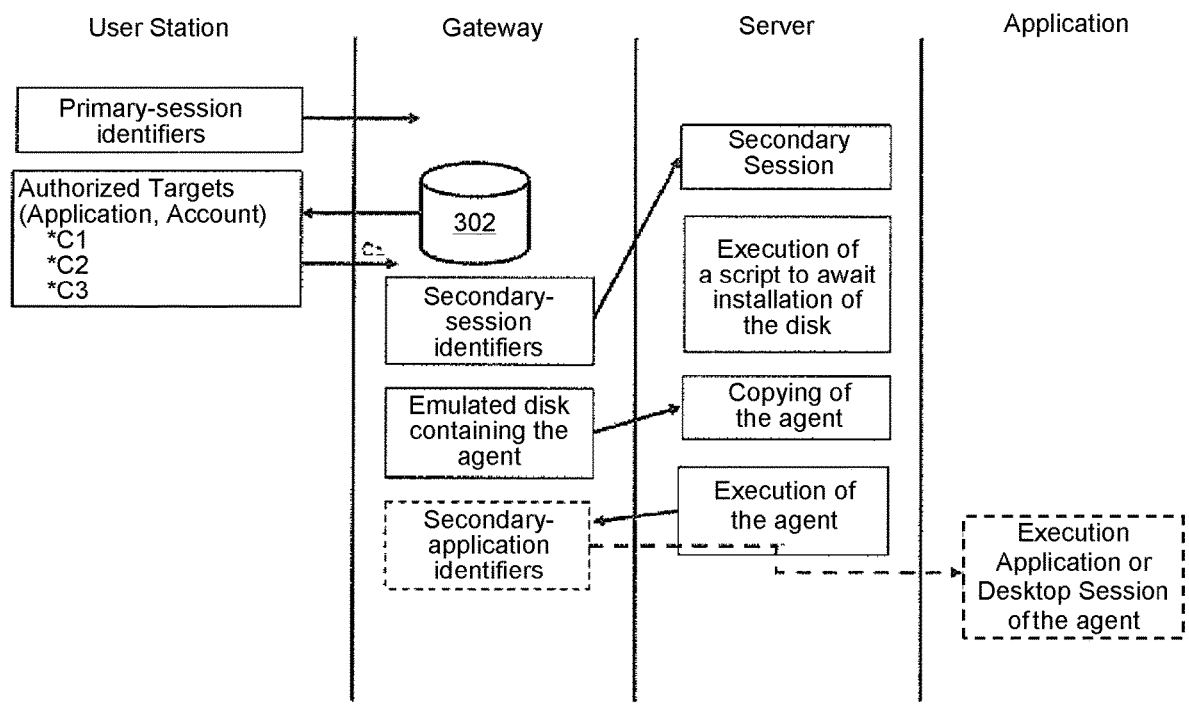
FIG. 3 is a schematic view of the steps of the process and of the data exchanged between the various computer resources.

FIG. 3 is a schematic view of the data exchanged between the various computer resources.

At the time of connection by a user, the terminal (100) transmits the primary numerical identifiers to the proxy gateway (300).

These authentication data are checked by the gateway (300) according to the information recorded in its database (302).

In the case of validation, the gateway (302) transmits the list of authorized targets (C1 to C3).

Each target corresponds to a pair:
application; and
account associated with the application.

The account comprises:
identification information; and
authentication information, such as a password.

The gateway transmits to the user (100), for each of the authorized targets, only the designation of the application and the designation of the identifier of the account, but not the authentication information, in the form of character strings designating the application/account pairs.

The user (100) selects one of the targets proposed and transmits the identifier thereof to the gateway (300).

The gateway (300) chooses a server and an account for opening a session on the server (500) according to the process of selecting the server and the previously described account.

It thus opens a secondary session, on the server. This session presents a disk emulated by the gateway. This disk comprises an agent. Then the gateway copies and starts the agent according to the previously described method. This starts the desktop manager or, in the case where the user has selected a specific application, it proceeds with the execution thereof, either directly or by means of a specialist computer code. This code requests of the gateway the identifier of the account of the application as well as the authentication data associated with this account.

The computer code then transmits this information to the application in order to control the execution of the application.

The invention claimed is:

1. A method for secure connection from a client station to a target computer resource comprising a server and, where applicable, a target application executed on the server using a proxy gateway comprising a memory for recording information relating to the connection as well as at least one agent executable on the server during a session, the method comprising the following steps:
    emission of a request for opening of a session by an application installed on the client station;
    opening a primary session between the client station and the proxy gateway by the sending of a message comprising an identifier of the target server or of the target application;
    opening of a session between the proxy gateway and the server; and
    installation of at least one agent on the server, successively comprising:
        opening a secondary session between the proxy gateway and the server, the opening of the secondary session comprising the establishment of a redirection of a disk emulated by the proxy gateway on which the at least one agent is recorded;
        execution of a time-delay script that waits until the emulated disk is available;
        copying of the at least one agent to a directory situated on the server;
        execution of the at least one agent on the server;
        establishment of a virtual channel between the server and the proxy gateway for communication between the at least one agent and the proxy gateway;
        opening of an uplink channel between the client station and the server; and
        launching of the desktop manager or the target application by the at least one agent by providing therein the necessary application identifiers transmitted by the proxy gateway.

2. The method of claim 1, further comprising a step of automatic destruction of the directory by the server at the end of the session.

3. The method of claim 1, wherein the at least one agent is executed in the session with the identifier used for opening the session.

4. The method of claim 1, wherein the method comprises a prior step of selecting a target resource by the transmission by the client terminal of a digital method comprising an identifier of a user, and of checking by the proxy gateway whether the information relating to the user associated with the identifier in a database relates to the target resource.

5. The method of claim 4, wherein the database comprises a list of applications and of the servers hosting each of the applications, as well as accounts associated with the applications.

6. The method of claim 1, wherein the method comprises a prior step of selecting a target resource via the transmission by the proxy gateway of digital data comprising a list of targets corresponding to the data recorded in a database in relation to the identifier transmitted, and of selection by the user of one of the targets listed in the list of targets.

7. The method of claim 6, wherein the database comprises a list of applications and servers hosting each of the applications, as well as accounts associated with the servers.

8. The method of claim 1, further comprising a step of opening a connection with the account associated with the selected target.

9. The method of claim 1, wherein the proxy gateway is configured to calculate a balance of the charges according to the number of connections already opened to each of the servers, and to select the least busy server for the new request.

10. The method of 1, wherein the method comprises a step of executing a computer code for:
    interrogating the proxy gateway and obtaining data comprising authentication information corresponding to the account of the application; and
    injecting the data comprising the authentication information into the application, opening an application session, and enabling the user to use that application.

11. The method of claim 10, wherein the computer code is permanently installed on the server, and an access path to the computer code is defined in the database.

12. The method of claim 10, wherein the computer code is temporarily transmitted by a dedicated channel provided in the multichannel protocol in order to be temporarily executed on the server.

13. The method of claim 1, wherein the request contains the identifier of the target server or of the target application.

* * * * *

UNITED STATES PATENT AND TRADEMARK OFFICE
CERTIFICATE OF CORRECTION

PATENT NO. : 10,594,662 B2  
APPLICATION NO. : 15/756866  
DATED : March 17, 2020  
INVENTOR(S) : Raphaël Zhou and Serge Adda Page 1 of 1

It is certified that error appears in the above-identified patent and that said Letters Patent is hereby corrected as shown below:

In the Specification

| | | |
|---|---|---|
| Column 2, | Line 32, | change "the client terminal" to --the client user terminal-- |
| Column 3, | Line 21, | change "has a terminal" to --has a user terminal-- |
| Column 4, | Line 43, | change "in the base" to --in the database-- |
| Column 4, | Line 62, | change "user, the terminal" to --user, the user terminal-- |
| Column 5, | Line 1, | change "gateway (302)" to --gateway (300)-- |

In the Claims

Claim 4, Column 6, Line 18, change "client terminal of" to --client station of--

Signed and Sealed this  
Twelfth Day of May, 2020

Andrei Iancu  
*Director of the United States Patent and Trademark Office*